No. 730,605. PATENTED JUNE 9, 1903.
G. BRIGGS.
BUNDLE LOADER.
APPLICATION FILED DEC. 16, 1901.
NO MODEL. 3 SHEETS—SHEET 3.
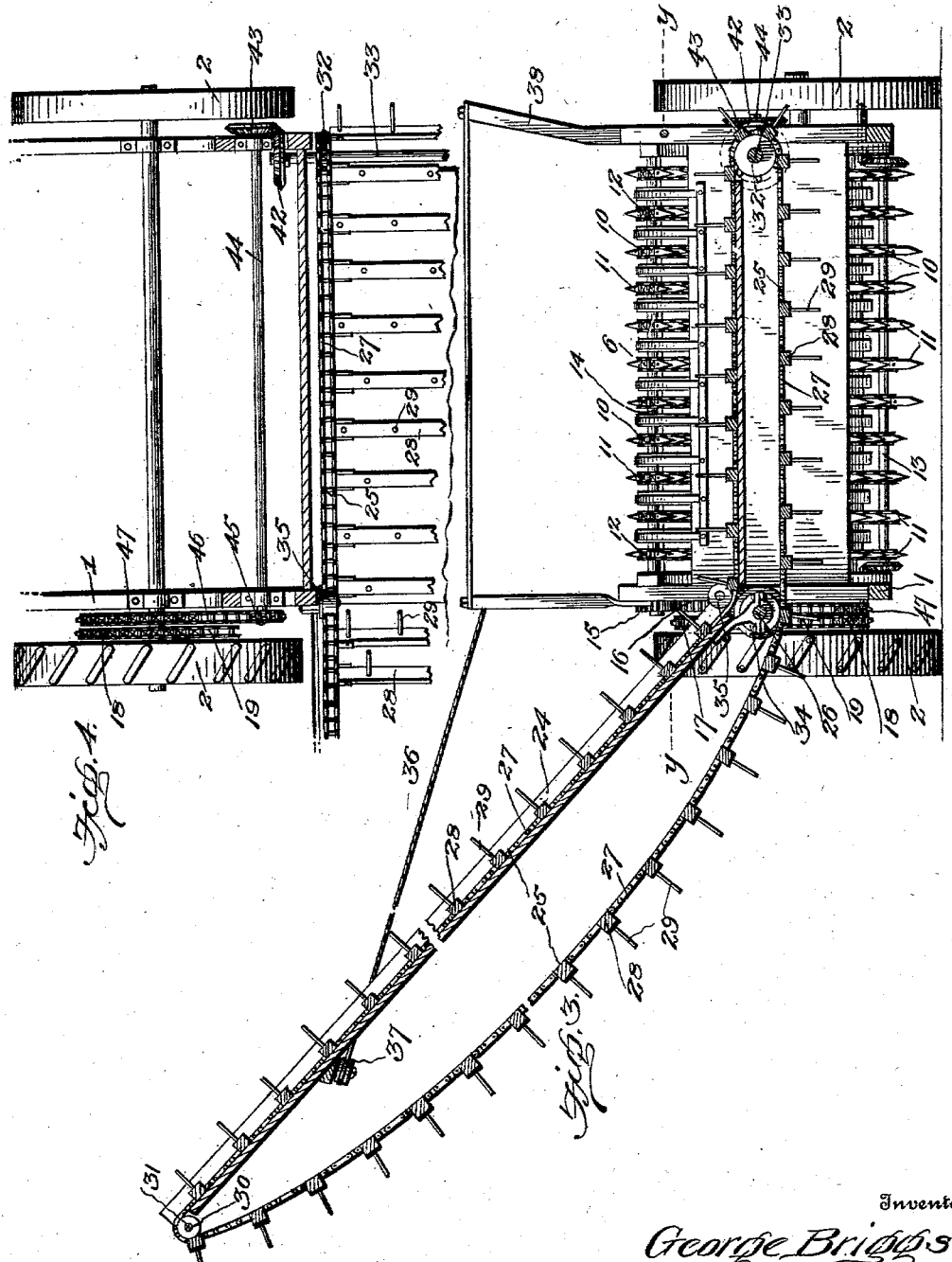
Witnesses
Inventor
George Briggs
By H. B. Wilson & Co.
Attorneys No. 730,605.

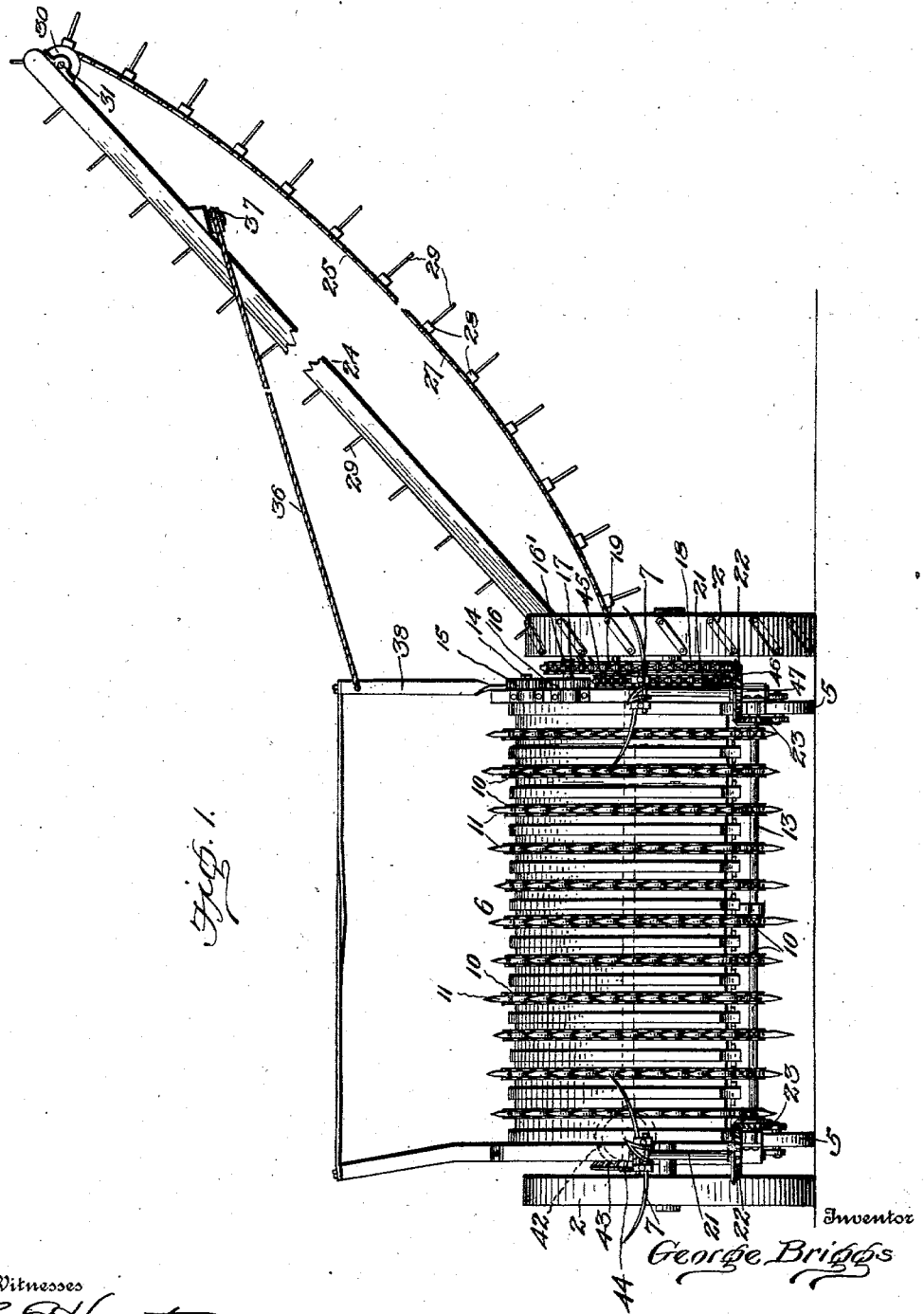

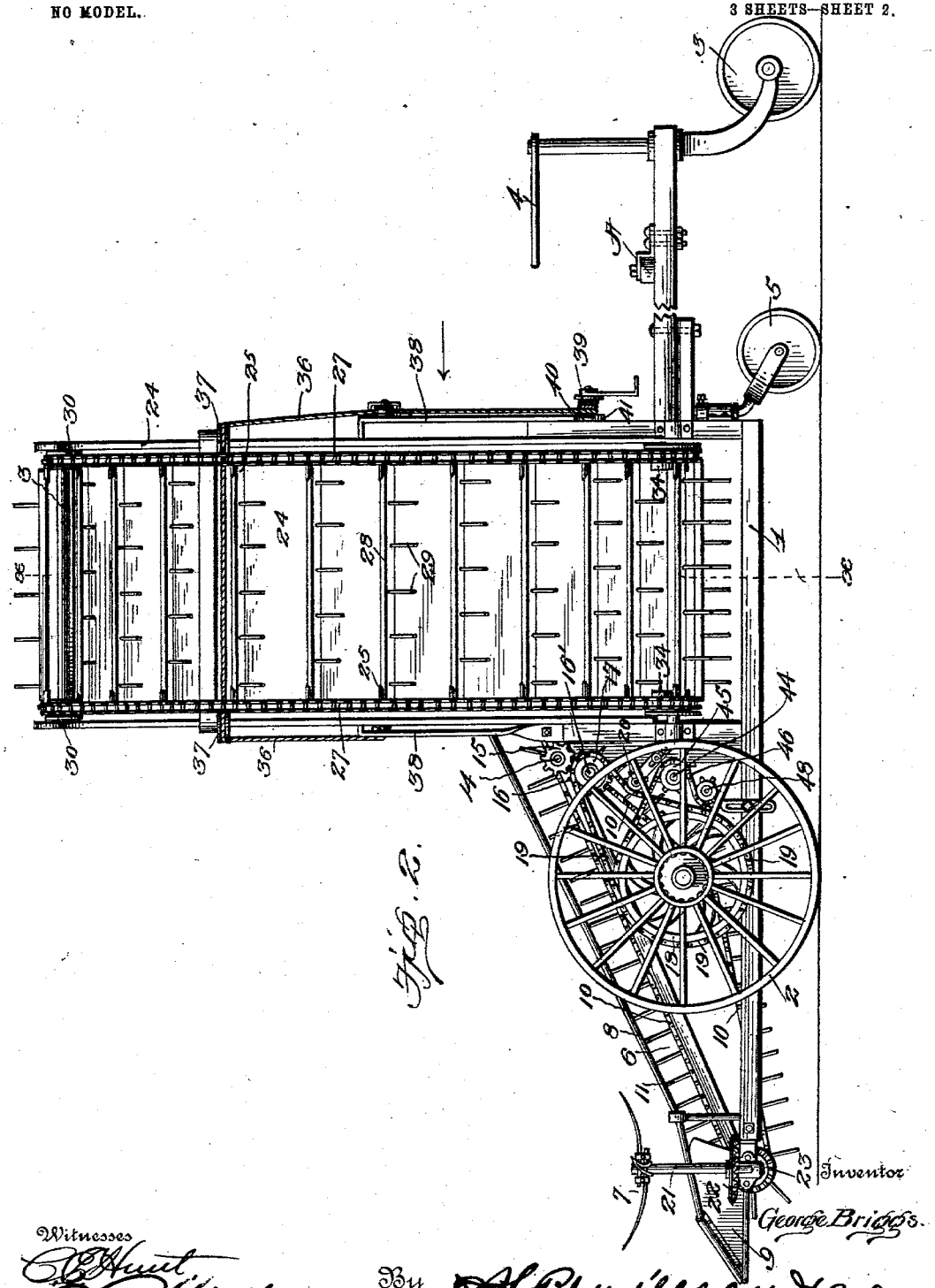

Patented June 9, 1903.

UNITED STATES PATENT OFFICE.

GEORGE BRIGGS, OF FARGO, NORTH DAKOTA.

BUNDLE-LOADER.

SPECIFICATION forming part of Letters Patent No. 730,605, dated June 9, 1903.

Application filed December 16, 1901. Serial No. 86,093. (No model.)

*To all whom it may concern:*

Be it known that I, GEORGE BRIGGS, a citizen of the United States, residing at Fargo, in the county of Cass and State of North Dakota, have invented certain new and useful Improvements in Bundle-Loaders; and I do declare the following to be a full, clear, and exact description of the invention, such as will enable others skilled in the art to which it appertains to make and use the same.

The invention relates to bundle-loaders.

The object of the invention is to provide a machine of this character which shall be simple of construction, durable in use, comparatively inexpensive of production, and which will effectually collect or gather the sheaves or bundles of grain and deliver them to a rack or wagon drawn along at the side of the machine, thereby enabling the rack when it has become loaded to be driven off to the thresher and its place be supplied by another rack, which may be driven up close to the side of the machine in a position to receive the bundles or shocks, thus enabling the machine to work continuously without stop or pause.

With this and other objects in view the invention consists in certain novel features of construction, combination, and arrangement of parts, which will be hereinafter more fully described, and particularly pointed out in the appended claims.

In the accompanying drawings, Figure 1 is a front elevation of the machine with the fenders and fender-rods removed for better illustration of the parts. Fig. 2 is a side elevation looking toward the under side of the transverse conveyer. Fig. 3 is a vertical transverse section on the line $x\,x$ of Fig. 2 looking in the direction of the arrow. Fig. 4 is a horizontal section on the line $y\,y$ of Fig. 3.

Referring to the drawings, 1 denotes the main supporting-frame; 2, the forward supporting or traction wheels; 3, the rear supporting and steering wheel; 4, a tiller for controlling the steering-wheel to guide the machine; 5, the intermediate supporting-wheels, and 6 an inclined gathering rake and conveyer arranged upon the forward portion of the frame. 7 denotes beaters arranged at the forward end of the machine, 8 fender-rods located on opposite sides of the gathering-conveyer 6 to prevent the bundles falling therefrom, and 9 shields suitably secured to the frame and located at the forward ends of the fender-rods to prevent the bundles being taken up from falling or being jostled off the conveyer while the machine is moving along and to guard the gearing which communicates motion to the beaters, as hereinafter described.

The gathering-conveyer 6 consists of a series of sprocket-chains 10, provided with teeth or prongs 11, which as the machine is moved to its work engage and gather up the shocks or bundles beaten rearwardly by the beaters 7 and convey them toward the rear of the machine. These chains pass around sprocket-pinions 12, fixed to the front lower and rear upper transverse shafts 13 and 14. The shaft 14 carries a spur-pinion 15, which meshes with a spur-pinion 16 on a stub-shaft 16', which stub-shaft also carries a sprocket-pinion 17, receiving motion from a drive sprocket-wheel 18, fixed to one of the traction-wheels 2 or to the axle of said wheels by means of a sprocket-chain 19, whereby the conveyer is driven. A belt-tightener 20 of approved construction is provided to enable the chain 19 to be kept taut. Each beater 7 is carried by a short vertical shaft 21, to which is fixed a bevel-gear-wheel 22, meshing with bevel-pinions 23 on the shaft 13, whereby during the operation of the machine said beaters are rotated to force the bundles onto the conveyer 6.

24 denotes a transverse conveyer-frame, and 25 the transverse conveyer, which receives the bundles from the gathering-conveyer 6 and deposits the same in the wagon or rack, which in practice is drawn alongside the machine. The frame 24 consists of a board or platform suitably connected to an idler-shaft 26, journaled upon a side of the frame, and upon which the frame is pivotally mounted to swing in a vertical plane. The conveyer 25 consists of side chains 27, connected by transverse slats 28, carrying prongs or fingers 29 to engage the bundles, and said chains pass over idlers 30 on a shaft 31, mounted upon the outer end of the frame 24, and around sprocket-pinions 32, carried by a shaft 33, journaled longitudinally on the side of the frame opposite the shaft 26. Between the two shafts 26 33 the conveyer 25 extends horizontally and is maintained in this position by idlers 34, carried by the said shaft 26, which bear upon the upper surfaces of the lower stretches of the chains 27, and by corresponding idlers 35, mounted to bear upon the upper surfaces of the upper stretches of said chains; but the outer portion of the conveyer extending between the shafts 26 and 31 is free to swing with the frame 24 to stand at any desired angle of inclination.

To adjust the frame 24 and support it in adjusted position, a rope or cable 36 is passed around pulleys 37 thereon and is made fast at one end to one side of a derrick-frame 38, rising from the frame 1, and connected at its opposite end to a windlass 39, supported upon the opposite side of said derrick-frame, and by means of which the rope or cable may be taken in and paid out to raise and lower the frame to the desired inclination. A pawl 40 is provided upon the frame 38 to engage a ratchet-wheel 41 on the windlass drum or shaft and hold the latter against retrograde rotation.

The shaft 33 carries a beveled gear 42, which meshes with a corresponding gear 43 on one end of a transverse shaft 44, the opposite end of which is provided with a sprocket-pinion 45, which is connected by a sprocket-chain 46 with a drive-sprocket 47, fixed to one of the wheels 2 or its axle alongside the sprocket 18, by which construction of gearing the transverse conveyer 25 is driven. An adjustable chain-tightener 48, similar to the tightener 20, is provided to enable the said chain 46 to be kept to the desired tautness.

In operation as the machine is advanced to its work the rake-teeth 11 on the conveyer 6 will gather up the bundles or shocks, and the beaters will strike them and force them upon the said conveyer, which will convey them rearwardly and deposit them upon the horizontal portion of the transverse conveyer, said bundles or shocks lying flat and crosswise of said transverse conveyer, in which position they are carried to the inclined portion of the transverse conveyer and then elevated and discharged from the upper end of said inclined portion of the conveyer onto a rack or wagon which is being drawn alongside the machine and which when it has become filled may be driven off to the thresher and another wagon, with its rack, driven under the machine to receive the bundles or shocks as they are discharged from the upper end of the transverse conveyer.

This machine is of that class in which the draft-animals are attached at a point at the rear of the conveyers—as, for instance, at the point designated by the letter A in Fig. 2—and is forced to its work in a manner similar to that class of reapers known as "headers."

From the foregoing description, taken in connection with the accompanying drawings, the construction, mode of operation, and advantages of my invention will be readily understood without requiring a more extended explanation.

Various changes in the form, proportion, and the minor details of construction may be resorted to without departing from the principle or sacrificing any of the advantages of the invention.

I claim—

1. In a loader of the class described, the combination of a wheeled frame, a traction-wheel therefor, sprocket-wheels 18, 47 driven by the traction-wheel, a rearwardly-moving endless conveyer on the front portion of the wheeled frame and having a gear 15, revoluble beaters geared directly to the front shaft of said conveyer and driven thereby, a stub-shaft having a fixed bearing, and provided with a gear that engages the gear 15 and also having a sprocket-wheel 17, an endless sprocket-chain connecting the sprocket-wheels 17 and 18, a shaft 44, in fixed bearings, and having a sprocket-wheel 45, an endless sprocket-chain connecting the sprocket-wheels 45, 47, a transversely-disposed endless carrier having an end portion disposed in rear of the first-mentioned conveyer and fed thereby, said receiving portion of the transverse carrier having means to permanently support it in a horizontal position, and having a driving-shaft geared to the shaft 44, a supporting-frame for the other end portion of said carrier, an idler-shaft therefor, forming the pivotal support for said frame, and means to incline said frame and the portion of the carrier carried thereby to any desired angle, substantially as described.

2. In a loader of the class described, the combination of a wheeled frame, a rearwardly-movable conveyer on the front portion thereof, a transversely-disposed flexible endless carrier having an end portion disposed in rear of the first-mentioned conveyer and fed thereby, said receiving portion of the transverse carrier having means to support it in a horizontal position, a pivotally-disposed frame for the other end portion of the transverse carrier whereby the same may be raised and lowered at will and disposed at any desired inclination, a stop and brace frame on the upper side of the wheeled frame, and disposed in a position to be engaged by and act as a stop for the pivoted frame of the transverse carrier, when the same is raised to a vertical position, and a connection between the pivoted frame of the transverse carrier and the said stop and brace frame to raise and adjust the pivoted frame of the transverse carrier, substantially as described.

In testimony whereof I have hereunto set my hand in presence of two subscribing witnesses.

GEORGE BRIGGS.

Witnesses:
SAM. F. CRABBE,
EDWARD EDGEWOOD.